Oct. 25, 1960   D. W. MOLINS   2,957,285
MANUFACTURE OF COMPOSITE MOUTHPIECES FOR CIGARETTES
Filed Feb. 10, 1959   4 Sheets-Sheet 1

INVENTOR
Desmond Walter Molins
By
Watson, Cole, Grindle & Watson
ATTORNEYS

INVENTOR
Desmond Walter Molins
By
Watson, Cole, Grindle & Watson
ATTORNEYS

United States Patent Office 2,957,285
Patented Oct. 25, 1960

2,957,285

MANUFACTURE OF COMPOSITE MOUTHPIECES FOR CIGARETTES

Desmond Walter Molins, Deptford, London, England, assignor to Molins Machine Company Limited, London, England, a British company Filed Feb. 10, 1959, Ser. No. 792,332

Claims priority, application Great Britain Feb. 27, 1958

6 Claims. (Cl. 53—28)

This invention concerns improvements in or relating to the manufacture of sections of composite mouthpiece rod for use in making mouthpiece cigarettes.

According to the present invention there is provided a method of making composite cigarette-mouthpiece rod sections, comprising the steps of assembling in line, mouthpiece components which differ in character, with components of one character in alternation with components of another character, feeding said components continuously in line, enclosing them in a continuous wrapper to form a continuous composite rod, and dividing the rod into sections, each containing at least one length which is double the intended length of a mouthpiece for an individual cigarette, by cutting the rod through components which are to be adjacent the tobacco in a mouthpiece cigarette. The method may comprise the step of bringing the assembled components into endwise abutment before enclosing them in the continuous wrapper, and may also comprise the steps of feeding components of one character from one source to a moving conveyor which carries them at spaced intervals, and feeding components of another character from another source into the spaces between the first said components.

Further according to the invention there is provided apparatus for making composite cigarette-mouthpiece rods which contain components which differ in character, comprising separate feeding devices for feeding said different components, conveyor means to receive and convey said components continuously in line, with components of one character in alternation with components of another character, means to enclose the said alternating components in a continuous wrapper to form a continuous composite rod, and cutting means to divide the continuous rod into separate rods, said cutting means being arranged to cut through components which are to be adjacent the tobacco in a mouthpiece cigarette, and to divide the continuous rod into separate rods each of which contains at least one length which is double the intended length of a mouthpiece for an individual cigarette.

The said apparatus may comprise abutting means to bring the said alternating components into endwise abutment before they are enclosed in the wrapper. The said abutting means may comprise means to reduce the forward speed of the said components.

The apparatus may comprise a first conveyor to receive components of one character and feed them forwardly at spaced intervals, means to feed components of another character into spaces between the first said components, and a further conveyor devide to receive the alternating components and to feed them forwardly at a slower speed than that of the first conveyor and thereby reduce their forward speed. The said further conveyor device may comprise a pair of opposed bands both of which engage the components.

The said first conveyor may be a suction conveyor having perforations in communication with a suction chamber, whereby the components received by the first conveyor are suctionally held thereto and maintained in desired spaced relationship. The said suction conveyor may be arranged to carry the said components on its undersurface.

The apparatus may comprise a support element extending beneath the suction conveyor at one end, a first feeding device to feed components of one character on to said support element so as to be suctionally engaged and fed at spaced intervals by the suction conveyor, a further support element extending beneath the suction conveyor at the other end and arranged to receive the said components from the suction conveyor, and a second feeding device to feed components of another character on to said further support element in alternation with components deposited thereon from the suction conveyor. The said further support element may be a stationary platform, and the said second feeding device comprises pushers arranged to push components over said platform towards said further conveyor device. The said feeding devices may comprise pushers to push components on to said support elements, said pushers being carried by rotating carriers and each being arranged to move rearwardly, relatively to the said rotating carriers, after pushing a component on to said support element, so as to reduce the risk of displacement of the said component.

Still further according to the invention there is provided apparatus for feeding mouthpiece components in line and in desired spaced relationship, comprising a support element, a feeding device to supply components in succession on to said support element, a moving suction conveyor extending over the said support element to receive said components on its undersurface and suctionally hold them thereon, a further support element extending beneath the suction conveyor to receive the said components therefrom, and means to cut off suction from the suction conveyor at a position above said further support element to enable said components to be deposited on the said further support element.

A method and apparatus in accordance with the invention will now be described by way of example with reference to the accompanying drawings, in which:

Figure 5 shows diagrammatically a part of a continuous composite rod; and

Figure 6 illustrates the manner in which a double-length composite mouthpiece portion is joined to two cigarette lengths and severed to produce two mouthpiece cigarettes.

Figure 1:
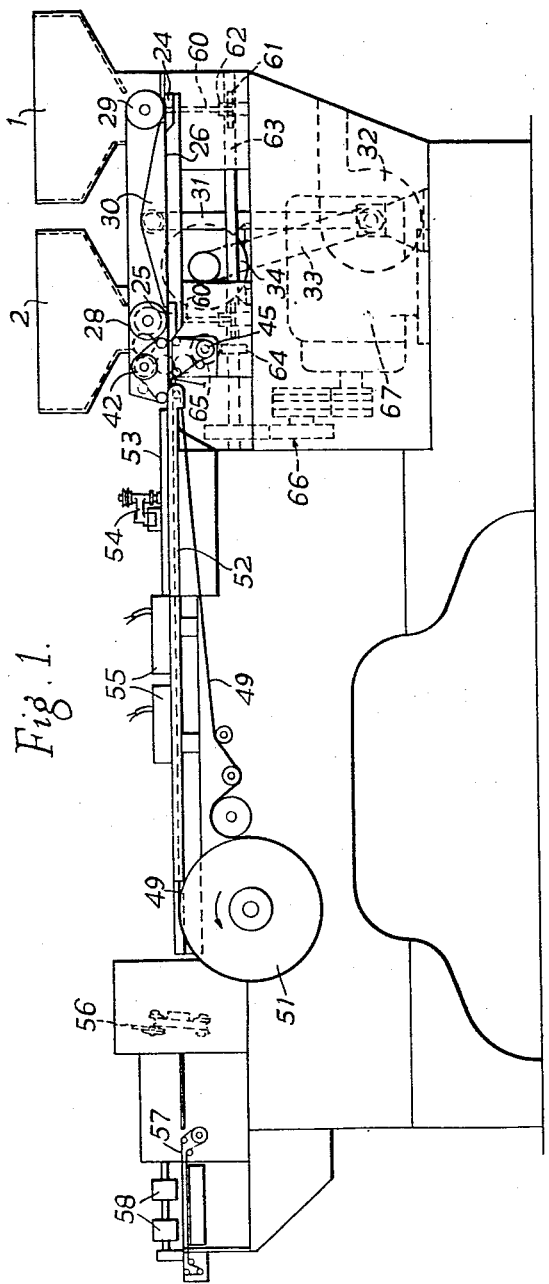
Figure 1 is a front elevation of a machine for making composite mouthpiece rods.

The machine is provided with two hoppers 1 and 2 for mouthpiece components of different character, for example, filter plug lengths made of different materials. Thus the hopper 1, for example, may contain mouthpiece components consisting of plug lengths made from the material known under the registered trademark "Estron," while the hopper 2 contains components consisting of plug lengths made from paper, cellulose or cotton material.

Each hopper is provided with feeding devices which will be described in relation to the hopper 2, since they are identical with those associated with the hopper 1. A rotatable drum 3 having flutes 4 on its periphery is located at the bottom of the hopper and receives plug lengths in the flutes. The drum is provided with three grooves 5 into which rotating disc knives 6 extend so as to subdivide each plug length into four separate lengths.

Figure 3:
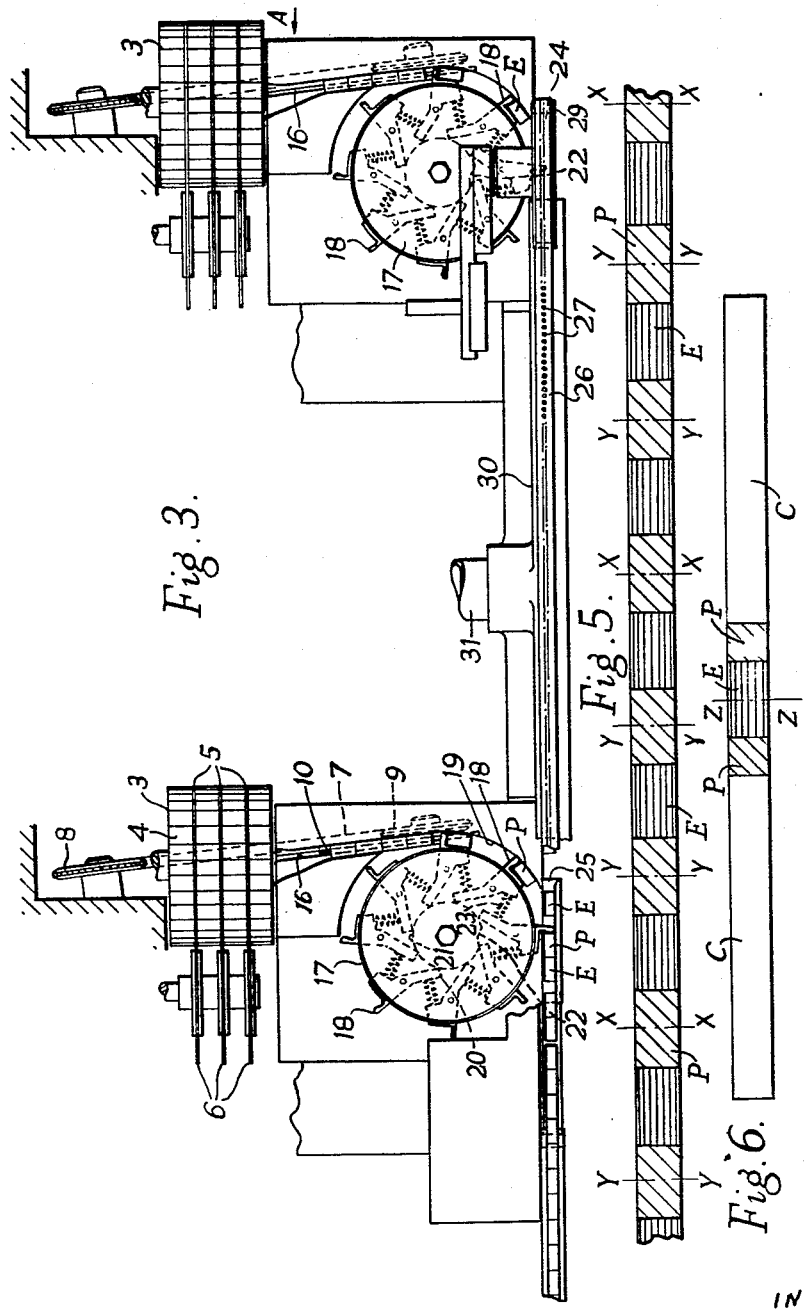
Figure 3 is a plan of Figure 2, partly broken away.

Beneath the drum an endless chain conveyor 7 extends, the chain passing about sprockets 8 and 9. Pusher pieces 10, best seen in Figure 4, fixed at intervals on the chain 7, pass through the lowermost flute of the drum 3. The chain 7 is inclined to the axis of the drum 3, as shown in Figure 3, so that as the drum rotates a pusher piece 10 enters a flute 4 and moves through it with a component in the direction of sideways movement of the flute. Each pusher piece pushes a line of plug lengths endwise from the flute through which it passes, the plugs being supported on guide elements 11. The pusher pieces are spaced so as to feed groups of plug lengths in an almost continuous line, as shown in Figure 4.

The guide element 11 has an upwardly inclined surface 12 leading to a higher horizontal guide surface 13.

Figure 4:
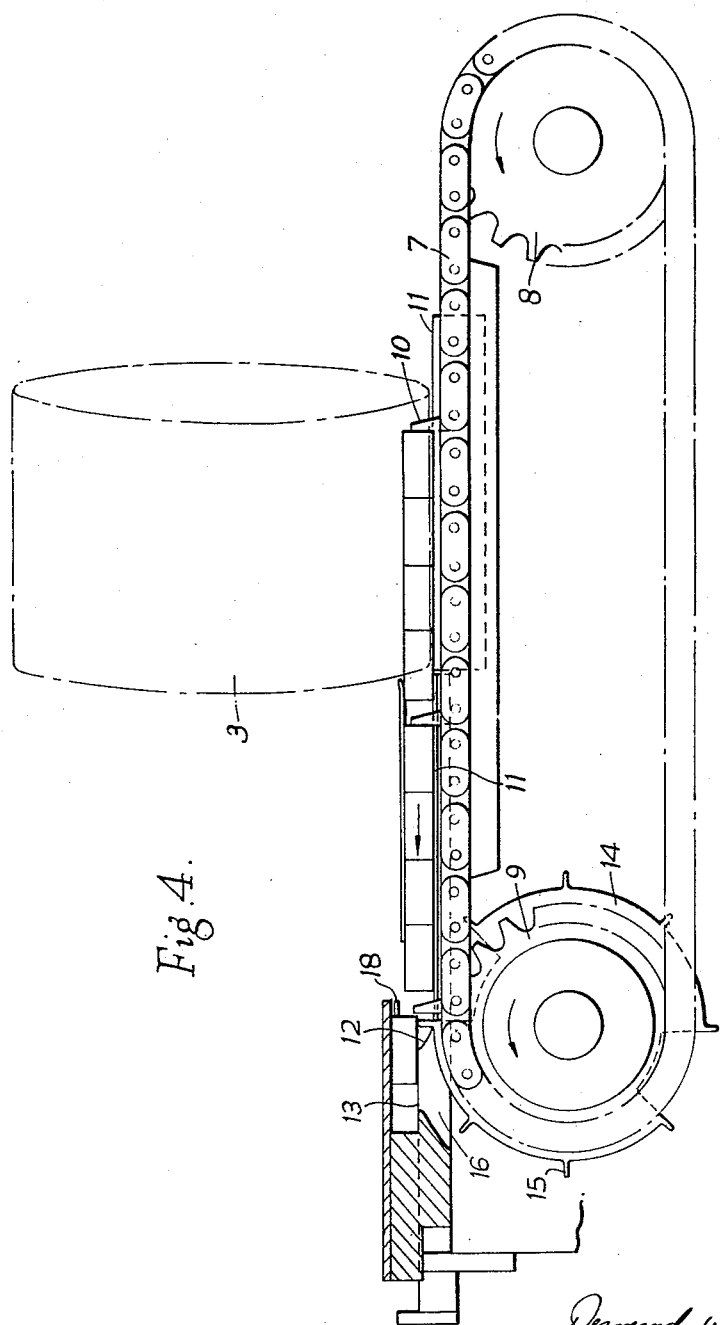
Figure 4 is a view, partly in section, in the direction of the arrow A, Figure 3.

Fixed to the sprocket 9 is a spider-wheel 14, Figure 4, having eight projections 15, and a recess immediately following every fourth projection 15. These recesses are to accommodate the pusher pieces 10, which are offset from the chain and in line with the projections 15. The projections 15 are suitably spaced so that each projection, on moving up through a slot 16 in the guide element 11, registers with a plug length and, in cooperation with the sloping surface 12, pushes the plug up to the higher level.

A rotatable disc 17, provided with pushers 18, is mounted and rotated so that each pusher 18 engages the rear end of a plug length which has been raised as just described, and pushes it forwardly along an arcuate path defined by an arcuate guide surface 19, Figure 3. Each pusher 18 is pivotally mounted on the disc 17, and has a tail 20 running over a fixed cam 21 provided with a recess 22. The tails 20 are spring-urged by springs 23 against the cam, so that when they reach the recess they enter it, thereby swinging the pushers rearwardly relatively to the disc 17.

Alongside the discs 17 are fixed support plates 24 and 25 to receive plug lengths from the pushers 18.

A perforated suction conveyor band 26 having a line of holes 27 and passing about pulleys 28 and 29 extends partially over the support plates 24 and 25. A suction box 30 is mounted above the lower run of the conveyor band 26 so as to apply suction through the holes 27. Air is drawn from the suction box 30 by way of a pipe 31 by a fan 32, Figure 1, which is driven by a belt 33 from a motor 34. The suction box 30 extends a sufficient distance over the support plates 24 and 25 to apply suction to the band 26 passing over those plates so that the band will pick up plug lengths from the plate 24 and carry them over the plate 25 before releasing them.

The two pusher discs 17, and the conveyor band 26, are suitably timed so that plug lengths delivered from the hopper 2 and pushed on to the plate 25 by the pushers 18 can enter spaces between successive plug lengths carried to and deposited on the plate 25 by the suction conveyor band 26.

Immediately beyond the support plate 25 is a pair of opposed endless conveyor bands 36 and 37 whose opposed surfaces run over fixed guides 38 and 39. The band 36 runs over rollers 40 and 41 and a drive roller 42, while the band 37 runs over rollers 43 and 44 and a drive roller 45. The bands 36 and 37 run at a speed slower than that of the suction conveyor 26. The upper band 36 extends beyond the lower band 37, and immediately beyond the band 37 is a small bridge piece 46 which bridges the gap between the band 37 and a paper web 47 which runs over a small guide roller 48. The paper web is supported and carried forwardly on a tape 49 passing over a roller 50 and a drive roller 51, Figure 1, and running in a trough 52.

The paper web is made of fairly stiff, stout paper.

The tape 49, with the paper web, extends through rod-forming mechanism 53, Figure 1, which includes folding devices to form the paper into a tube about the plug lengths, and a gumming device 54 to apply gum or other suitable adhesive to one edge portion of the web before it is finally folded down on the other edge portion. Heaters 55 are located immediately beyond the folding devices, to dry the gummed seam of the paper tube. The rod-forming mechanism just referred to is similar in construction and operation to the rod-forming mechanism employed for forming a continuous rod on a continuous rod cigarette-making machine, and does not require detailed description.

Some distance beyond the heaters is a cut-off mechanism 56, similar to the cut-off mechanism in a cigarette-making machine, and suitably timed to cut at desired intervals through the continuous composite rod formed by enclosing the plug lengths in the paper web. A short conveyor 57, arranged to move a little faster than the tape 49, receives the sections cut from the rod and spaces them apart endwise before they come within the range of action of a deflector device 58 which deflects them sideways on to a catcher band (not shown) or any other suitable conveyor which carries them sideways.

The driving means for the discs 17, the pulley 28, and the opposed bands 36 and 37, is illustrated in Figure 1.

The discs 17 are mounted on vertical shafts 60 on which are fixed helical gears 61 driven by helical gears 62 mounted on a shaft 63. The drive for the drive roller 45 is effected by a pair of helical gears 64 and 65, the latter of which drives the drive roller 42 through a train of gears. The shaft 63 is driven, through a gear train generally indicated by the reference 66, by a motor 67.

The operation of the machine is as follows.

Plug lengths of different character are placed in the hoppers 1 and 2; thus plug lengths of "Estron" may be placed in the hopper 1, and plug lengths of paper may be placed in the hopper 2. It will be understood that these are merely examples of mouthpiece components of different character, and that many other kinds of components can be used according to what is required in the cigarette mouthpieces to be made.

Plug lengths drawn from the hopper 1 are fed by the devices described above and pushed by pushers on to the support plate 24. Each pusher in turn delivers a plug length on to the plate and pushes it along the plate until it is drawn by suction on to the underside of the suction conveyor band 26, which passes over the plate with a very small clearance between the band and a plug length. The tail 20 of the pusher then enters the recess 22 in the cam 21 and the pusher swings back relatively to the disc 17, thus disengaging the plug length, which is then controlled by the suction band.

Figure 2:
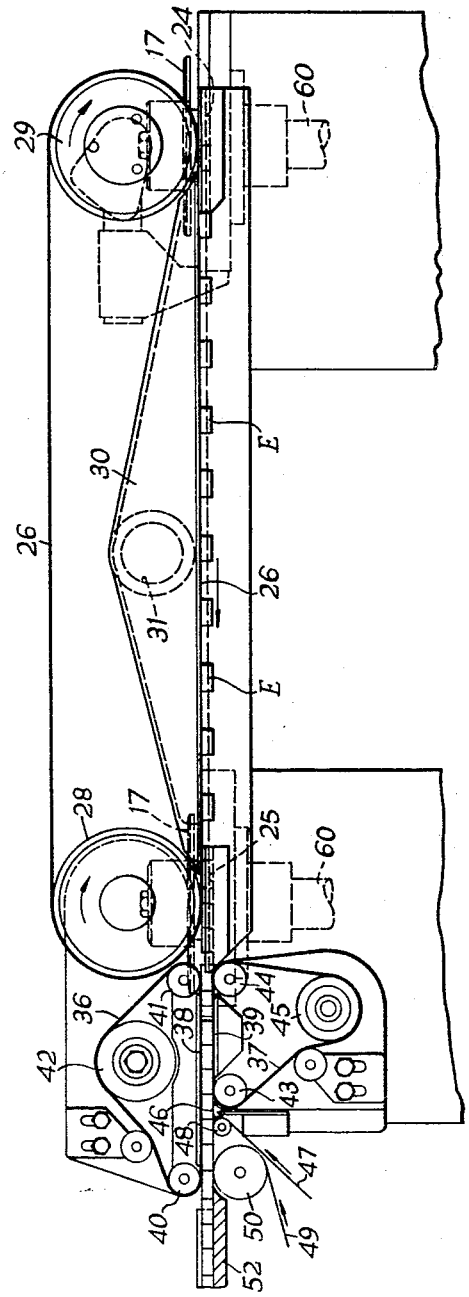
Figure 2 is an enlarged view of part of the apparatus shown in Figure 1.

Successive "Estron" plug lengths are thus carried at spaced intervals on the underside of the suction band, as illustrated in Figure 2. For convenience these plug lengths are given the reference "E."

At the same time, paper plug lengths (indicated by the reference "P") are drawn from the hopper 2 and fed into the range of action of the pushers 18 associated with the hopper 2, and are thereby pushed in succession on to the support plate 25. These plugs P are also fed at spaced intervals equal to those between the plugs E.

As a plug length E is carried over the platform 25, the part of the band 26 by which it is suctionally held passes beyond the suction box 30 and the plug length is thus released from the band and deposited on the plate 25. The timing of the pushers and the suction conveyor is such that a plug length E is deposited on the plate 25 between two plug lengths P; or, to put it another way, a plug length P is pushed on to the plate between two plug lengths E.

A length E when deposited on the plate 25, from the band 26 will continue to move some distance forward, sliding over the plate 25, and its rear end face is then engaged by the leading face of a plug length P which is being pushed forward along the plate by a pusher 18. Thus pairs of lengths of different character are abutted on the plate 25. Each pair of plugs is pushed forwardly by a pusher 18, which causes the plugs to move over the plate 25 at or approximately at the speed of the suction conveyor 26, until they are engaged by the slower-moving opposed bands 36 and 37. At that stage the tail 18 of the pusher enters the recess 22 in the cam 21, so that the pusher swings backwardly relatively to the rotating disc on which it is pivoted, and the speed at which it is pushing the plugs along the plate 25 is thereby reduced to that of the bands 36 and 37. This speed reduction of the plug lengths causes them to be all abutted end to end, and the assembled, abutted plug lengths, arranged in line and with "Estron" lengths in alternation with paper plugs, are fed on to the stiff paper web 47.

The paper web is folded about the abutted plug lengths by the folding device 53, adhesive being applied by the gumming device 54, and the seam is engaged by the heaters 55 to dry the adhesive. The resulting continuous composite rod is cut by the cut-off 56 into separate sections or mouthpiece rods, which are accelerated and spaced apart by the conveyor 57 and are then deflected sideways by the deflector mechanism 58.

The cut-off mechanism is timed to cut the continuous rod only through the paper plug lengths P. Figure 5 shows diagrammatically a piece of the continuous composite rod, the lines X—X indicating the positions at which the continuous rod is severed by the cut-off. This produces sections or rods each of which is six times the length required for an individual mouthpiece for a single cigarette. The lines Y—Y indicate the positions at which these sextuple-length rods are subsequently cut in order to produce double-length mouthpiece sections or rods. It will be seen that in both cases the rod is severed only through paper plug lengths P. Figure 6 shows diagrammatically a double-length composite mouthpiece section or rod (Y—Y, Figure 5) joined to and between two cigarette lengths, and the line Z—Z indicates the position at which this cigarette and mouthpiece assemblage is cut—namely through the plug length E—to produce two individual mouthpiece cigarettes. It will be seen that in each of these cigarettes, the component P is adjacent the tobacco while the component E is at the extreme end of the mouthpiece portion of the cigarette.

By means of the arrangement and method described, it is thus possible to produce composite rods (that is, sections of a continuous composite rod) each of which contains at least one length (in the present case, three lengths) double the length required in an individual cigarette. Where, as in the present case, the length of such a rod is a multiple of a double-length mouthpiece portion, it can conveniently be sub-divided into double-length portions with those components which are intended to be adjacent the tobacco in a cigarette disposed at opposite ends, as shown in Figure 6. If desired, of course, the continuous rod can be divided in the first instance into double-length portions by cutting through all the paper plug lengths P.

In the example described above, the components which are arranged to be adjacent the tobacco portion of a cigarette have been described as paper plug lengths. It will be understood, however, that any other suitable component could be used according to any particular requirement. Similarly the outer component—that is, the component which is to be at the extreme end of the finished mouthpiece cigarette—could be of any desired material. Thus where herein and in the appended claims reference is made to mouthpiece components of different character, it is to be understood to refer to any suitable mouthpiece elements or components which differ from each other by reason of the materials of which they are made, or in their construction.

Preferably the component which is to be located adjacent the tobacco is chosen for its effectiveness as a filter, while the other component, which will be at the extreme end of the finished cigarette, is preferably of a nature such that it presents a pleasing appearance. This makes it possible to use a filter component designed purely for its effectiveness as a filter, and without having regard to its appearance, since by combining it with another component in the manner described above, it will be located between the tobacco and the other component in a finished mouthpiece cigarette, and will thus be concealed by the other component, which can be chosen for its appearance as much as for its filtering or other qualities.

What I claim as my invention and desire to secure by Letters Patent is:

1. A method of making composite cigarette-mouthpiece rods each of which comprises components of different character and each of which is divisible into individual mouthpieces for cigarettes, each such mouthpiece comprising two adjacent parts of different character, said method comprising the steps of feeding double-length components endwise in line with components of one character alternating with components of another character, bringing the said components into endwise abutment, enclosing them in a continuous wrapper to form a continuous composite rod, and subdividing said continuous rod by cutting it at such intervals as to cut only through components which are of the character required in that part of an individual composite mouthpiece which is to be located next to the tobacco in a mouthpiece cigarette, thereby producing rods each of which contains at least one double-length component of the character required in that part of an individual composite mouthpiece which is to be located at the extreme mouthpiece end of a mouthpiece cigarette.

2. Apparatus for making composite cigarette-mouthpiece rods which contain components which differ in character, and each of which rods is divisible into individual mouthpieces for cigarettes, each said mouthpiece comprising two adjacent parts of different character, comprising separate feeding devices for feeding said different components, conveyor means to receive and convey said components continuously in line, with components of one character in alternation with components of another character, means to enclose the said alternating components in a continuous wrapper to form a continuous composite rod, and cutting means to divide the continuous rod into separate rods, said cutting means being timed to cut only through components which are of the character required in that part of an individual composite mouthpiece which is to be adjacent the tobacco in a mouthpiece cigarette, and to divide the continuous rod into separate rods each of which contains at least one double-length component which is of the character required in that part of an individual composite mouthpiece which is to be located at the extreme mouthpiece end of a mouthpiece cigarette.

3. Apparatus as claimed in claim 2, comprising a first and a second support member to receive components from a first and a second of said separate feeding devices respectively, a suction conveyor extending over and between both said support members and arranged to transfer components from the first said support member to the second said support member, said suction conveyor being arranged to carry the said components on its under-surface, suction means to apply suction to the conveyor, and means to cut off suction from the conveyor at a position above the said second support member so that components are deposited thereon by the conveyor, the two said separate feeding devices being arranged to feed components at spaced intervals such that components from the said first feeding device delivered by the suction conveyor on to the said second support member are deposited in spaces between components fed directly to the said second support member by the said second feeding device.

4. Apparatus as claimed in claim 3, wherein the said second support member is a stationary platform, and the said second feeding device comprises pushers arranged to push components over said platform towards said conveyor means.

5. Apparatus as claimed in claim 3, wherein both said feeding devices comprise pushers to push components on to said support members, said pushers being carried by rotating carriers and each being arranged to move rearwardly, relatively to the said rotating carriers, after pushing a component on to the associated support member, so as to reduce the risk of displacement of the said component.

6. Apparatus for feeding mouthpiece components in line and in desired spaced relationship, comprising a support element, a feeding device to supply components in succession on to said support element, a moving suction conveyor extending over the said support element to receive said components on its undersurface and suctionally hold them thereon, a further support element extending beneath the suction conveyor to receive the said components therefrom, second feeding device to feed other components directly to the further support element at spaced intervals, and means to cut off suction from the suction conveyor at a position above said further support element to enable said components to be deposited on the said further support element in spaces between the said other components.

References Cited in the file of this patent

UNITED STATES PATENTS

| | | |
|---|---|---|
| 2,605,597 | Scheib | Aug. 5, 1952 |
| 2,695,618 | Policansky | Nov. 30, 1954 |
| 2,742,907 | Policansky | Apr. 24, 1956 |
| 2,775,081 | Stirn et al. | Dec. 25, 1956 |